United States Patent
Lu

(10) Patent No.: US 11,106,564 B2
(45) Date of Patent: Aug. 31, 2021

(54) DEFRAMEWORKING FOR STATIC PROGRAM ANALYSIS

(71) Applicant: Oracle International Corporation, Redwood Shores, CA (US)

(72) Inventor: Yi Lu, Toowong (AU)

(73) Assignee: Oracle International Corporation, Redwood Shores, CA (US)

( * ) Notice: Subject to any disclaimer, the term of this patent is extended or adjusted under 35 U.S.C. 154(b) by 55 days.

(21) Appl. No.: 16/425,707

(22) Filed: May 29, 2019

(65) Prior Publication Data

US 2020/0379874 A1 Dec. 3, 2020

(51) Int. Cl.
*G06F 11/36* (2006.01)
(52) U.S. Cl.
CPC ................................ *G06F 11/362* (2013.01)
(58) Field of Classification Search
CPC ........................................................ G06F 11/362
USPC ...................................................... 717/131
See application file for complete search history.

(56) References Cited

U.S. PATENT DOCUMENTS

| | | | | |
|---|---|---|---|---|
| 8,260,757 B1 * | 9/2012 | Chatterjee | ............. | G06F 16/256 707/703 |
| 8,856,764 B2 * | 10/2014 | Pistoia | ................ | G06F 11/3604 717/152 |
| 9,323,644 B1 * | 4/2016 | Hale | .................... | G06F 16/2237 |
| 2006/0031572 A1 * | 2/2006 | Feuerstein | .............. | G06F 9/542 709/238 |
| 2007/0083853 A1 * | 4/2007 | Cook | ........................ | G06F 8/38 717/120 |
| 2012/0192161 A1 * | 7/2012 | Pistoia | ..................... | G06F 8/75 717/131 |
| 2013/0086676 A1 * | 4/2013 | Chess | ................... | G06F 21/554 726/22 |
| 2014/0075561 A1 * | 3/2014 | Guarnieri | ............ | H04L 63/1408 726/25 |
| 2015/0067653 A1 * | 3/2015 | Guarnieri | ................. | G06F 8/30 717/126 |

OTHER PUBLICATIONS

Nuri, Spring bean Scopes: Guide to understand the different Bean scopes (Published on Apr. 30, 2018) retrieved from http://blog.marcnuri.com/spring-bean-scopes-guide-to-understand-the-different-bean-scopes/ on Dec. 26, 2020.*

Sridharan, Manu et al., "F4F: Taint Analysis of Framework-based Web Applications"; OOPSLA '11, Proceedings of the 2011 ACM international conference on Object oriented programming systems languages and applications; Portland, Oregon, USA; Oct. 22-27, 2001; pp. 1053-1068 (15 pages).

(Continued)

*Primary Examiner* — Lewis A Bullock, Jr.
*Assistant Examiner* — Theodore E Hebert
(74) *Attorney, Agent, or Firm* — Ferguson Braswell Fraser Kubasta PC

(57) ABSTRACT

A method for detecting a defect may include extracting, from application code, a registration of a framework object and a request for the framework object, deriving a synthetic request using the registration and the request, transforming the application code by replacing, by a computer processor, the request with the synthetic request, and detecting the defect by performing a static analysis on the transformed application code.

16 Claims, 13 Drawing Sheets

(56) References Cited

OTHER PUBLICATIONS

Antkiewicz, Michal et al., "Automatic Extraction of Framework-Specific Models from Framework-Based Application Code"; ASE'07, Proceedings of the twenty-second IEEE/ACM international conference on Automated software engineering; Atlanta, Georgia, USA; Nov. 5-9, 2007; pp. 214-223 (10 pages).

Weinberger, Joel et al., "A Systematic Analysis of XSS Sanitization in Web Application Frameworks"; ESORICS'11, Proceedings of the 16th European conference on Research in computer security; Leuven, Belgium; Sep. 12-14, 2011; pp. 150-171 (20 pages).

* cited by examiner

Global Variables A
352

Transformed Code A
350A

```
public class Configurations {
    public static SpellCheckerConfig spellCheckerConfig
        = new SpellCheckerConfig();
    public static DictionaryConfig dictionaryConfig
        = new DictionaryConfig();
} public class SingletonBeans {
    public static EnglishSpellChecker getSingletonEnglishSpellChecker;
    public static EnglishDictionary getEnglishDictionary;
    public static FrenchDictionary getFrenchDictionary;
} public class RequestBeans { } public class SessionBeans { } public class SpellCheckerConfig {
    ...
    SpellCheckerConfig() {
        SingletonBeans.getSingletonEnglishSpellChecker
            = this.getSingletonEnglishSpellChecker();
    } public EnglishSpellChecker getSingletonEnglishSpellChecker() {
        return new EnglishSpellChecker(englishDictionary);
    } public FrenchSpellingChecker getPrototypeFrenchSpellChecker() {
        return new FrenchSpellChecker(frenchDictionary);
    } private EnglishDictionary englishDictionary
        = SingletonBeans.getEnglishDictionary;
```

Synthetic Constructor A
354A

Synthetic Request A
362A

FIG. 3C

```
    private FrenchDictionary frenchDictionary
        = SingletonBeans.getFrenchDictionary;
    ...
} public class DictionaryConfig {
    ...
    DictionaryConfig() {
        SingletonBeans.getEnglishDictionary
            = this.getEnglishDictionary();
        SingletonBeans.getFrenchDictionary
            = this.getFrenchDictionary();
    } public EnglishDictionary getEnglishDictionary() {
        return new EnglishDictionary();
    } public FrenchDictionary getFrenchDictionary() {
        return new FrenchDictionary();
    }
    ...
} public class MyWordProcessor {
    ...
    private EnglishSpellChecker englishSpellChecker
        = SingletonBeans.getSingletonEnglishSpellChecker;
    ...
    public void useSpellChecker {
        ...
        //   ApplicationContext applicationContext
        //       = ApplicationContextProvider.getApplicationContext();
        //   frenchSpellChecker
        //       = applicationContext.getBean(FrenchSpellChecker.class);
        frenchSpellChecker = Configurations.spellCheckerConfig
            .getPrototypeFrenchSpellChecker();
```

Transformed Code B 350B

Synthetic Request B 362B

Synthetic Constructor B 354B

Synthetic Constructor C 354C

Synthetic Request C 362C

Synthetic Request D 362D

FIG. 3D

Configuration
Information C
401

Application
Code C
400C

@Configuration

Registration E
402 public class MyConfig {
@Bean public MyBean getMyBean () { return new MyBean() ;

}

} public class MyBean {

Data data ;

public void put(Data d) { data = d;

} public Data get() { return data ;

Application Code D
400D

```
// Web service put tainted data on the registered bean public class WebService { protected void doGet(Data tainted) {   ← Taint Source 414

...

MyBean myBean = ctx.getBean(MyBean.class) ; // request bean programmatically
                                              ↘ Request E
                                                412E
        myBean.put(tainted);

...

}

...

} public class Library {

@Autowired private MyBean bean ; // request bean declaratively
       ↙
Request F   public void doSomething() {
412F
        sensitiveOperation(bean.get()) ;
                              ↘ Security-Sensitive
        }                        Operation
    }                            416
}
```

FIG. 4B

```
Synthetic                                              Transformed
Constructor D                                          Code D
   454      public class MyConfig {                    450D MyConfig() {

SingletonBeans.getMyBean = this.getMyBean ();

} public MyBean getMyBean () { return new MyBean();

}

} public class MyBean {

Data data ;

public void put(Data d) { data = d;

} public Data get() { return data ;

}

}
                                                       Taint Source
            public class WebService {                  414
Synthetic
Request E     protected void doGet(Data tainted) {
  462E
                ...

MyBean myBean = SingletonBeans.getMyBean ;

myBean.put(tainted);

Transformed
Code E
450E

Synthetic
Request F
462F

```
public class Library { private MyBean bean = SingletonBeans.getMyBean;

public void doSomething() { sensitiveOperation(bean.get());

}
}
```

Security-Sensitive
Operation
416

FIG. 4E

… # DEFRAMEWORKING FOR STATIC PROGRAM ANALYSIS

BACKGROUND

Many modern applications use one or more frameworks to facilitate software development. While frameworks provide useful abstractions for commonly used functionality, frameworks typically make extensive use of dynamic language constructs (e.g., reflection) to implement inversion of control. Static analysis techniques used in the detection of defects (e.g., security vulnerabilities, memory leaks, etc.) may be ineffective when applied to framework-based applications that leverage such dynamic language constructs whose behavior only becomes evident at runtime. For example, it is difficult to statically analyze a method call when the method name is based on a string that is manipulated at runtime.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for detecting a defect including extracting, from application code, a registration of a framework object and a request for the framework object, deriving a synthetic request using the registration and the request, transforming the application code by replacing, by a computer processor, the request with the synthetic request, and detecting the defect by performing a static analysis on the transformed application code.

In general, in one aspect, one or more embodiments relate to a system for detecting a defect including a memory coupled to a computer processor, a repository configured to store application code including a registration of a framework object and a request for the framework object, and a code transformer, executing on the computer processor and using the memory, configured to extract the registration and the request from the application code, derive a synthetic request using the registration and the request, transform the application code by replacing the request with the synthetic request, and detect the defect by performing a static analysis on the transformed application code.

In general, in one aspect, one or more embodiments relate to a method for detecting a taint flow including extracting, from application code, a registration of a framework object and a request for the framework object, deriving, using the registration and the request, a synthetic request that accesses an instance of the framework object, transforming the application code by replacing, by a computer processor, the request with the synthetic request, and detecting, by performing a static analysis on the transformed application code, the taint flow by determining that a security-sensitive operation accesses the instance of the framework object, and determining that a taint source accesses the instance of the framework object.

Other aspects of the invention will be apparent from the following description and the appended claims.

BRIEF DESCRIPTION OF DRAWINGS

FIG. 3A, FIG. 3B, FIG. 3C, and FIG. 3D show examples in accordance with one or more embodiments of the invention.

FIG. 4A, FIG. 4B, FIG. 4C, FIG. 4D, and FIG. 4E show examples in accordance with one or more embodiments of the invention.

DETAILED DESCRIPTION

Figure 1:
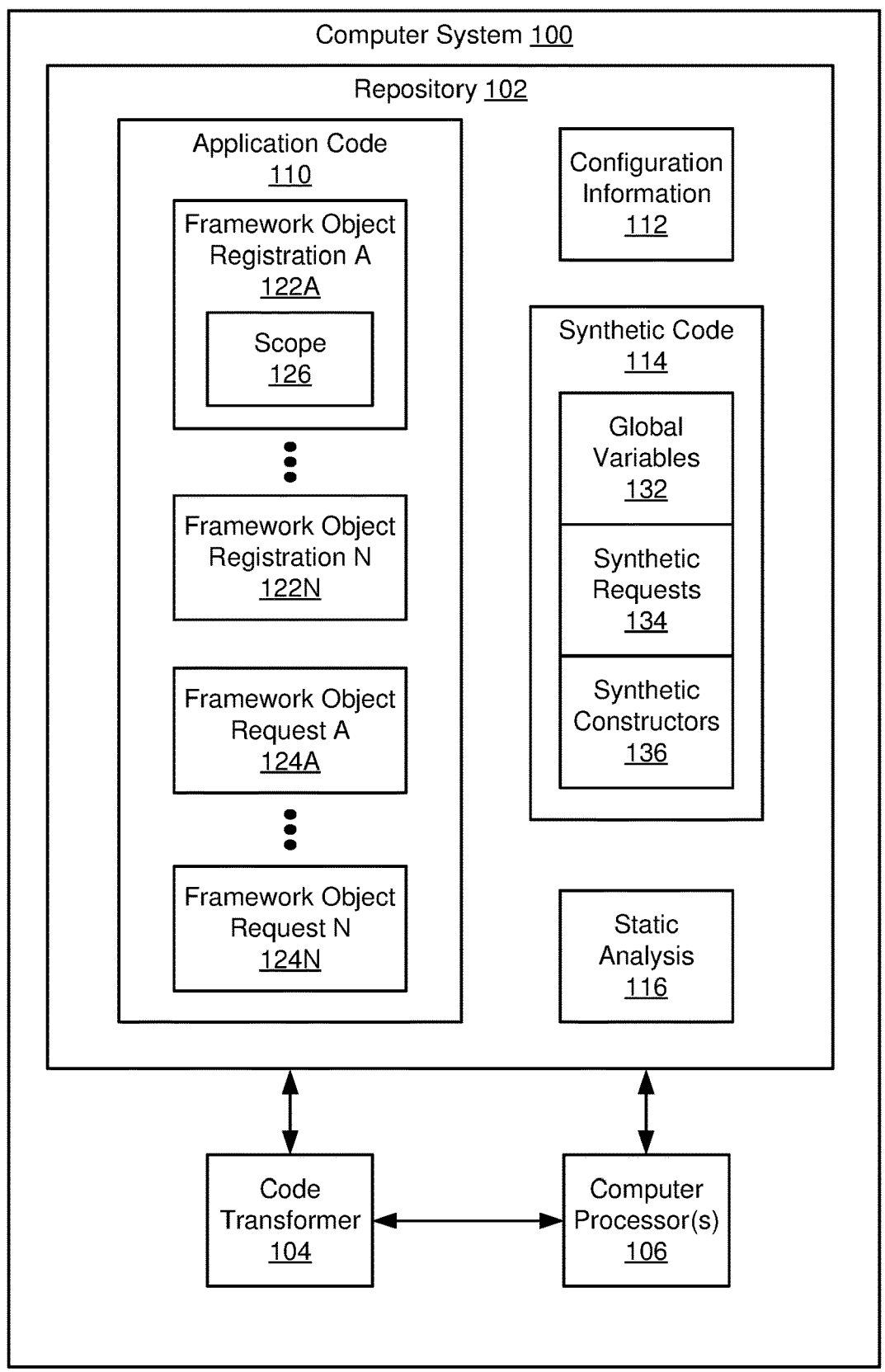
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to transforming application code that uses a framework. In one or more embodiments, implicit flows hidden within the framework are exposed by transforming framework object registrations and framework object requests into explicit object instance creations and accesses to object instances. A framework object registration (e.g., the @Bean annotation in the Spring framework) may indicate that an object (e.g., a bean) is to be managed by the framework. A framework object request (e.g., the @Autowired annotation in the Spring framework) may inject an object into a field. The explicit, exposed flows from the creation of object instances to the accesses of the object instances in the transformed application code may be used by a static analysis to detect defects (e.g., taint flows).

FIG. 1 shows a computer system (100) in accordance with one or more embodiments of the invention. As shown in FIG. 1, the computer system (100) includes a repository (102), a code transformer (104), and one or more computer processors (106). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes application code (110), configuration information (112), synthetic code (114) and a static analysis (116). In one or more embodiments, the application code (110) is a collection of source code including various software components. The application code (110) may include statements written in a programming language, or intermediate representation (e.g., byte code). The application code (110) may be transformed by a compiler into binary machine code. Compiled machine code may be executed by the processor (106) in order to execute software components generated from the application code (110). In one or more embodiments, the application code (110) may be any collection of object code (e.g., machine code generated by a compiler) or another form of the application code (110).

In one or more embodiments, the application code (110) includes framework object registrations (122A, 122N) and framework object requests (124A, 124N). A framework object registration (122A) may indicate that an object (e.g., a bean) is to be managed by a framework. The object managed by the framework may be referred to as a framework object. In one or more embodiments, a framework is code that provides generic functionality that may be selectively modified by user-written code. In one or more embodiments, the user-written code is included in the application code (110). The user-written code may be annotations included within the application code (110). For example, application code written in Java may include annotations interpreted by the Spring framework. An example of a framework object registration (122A) is the @Bean annotation indicating that an object returned by the annotated method is a bean managed by the Spring framework. Alternatively, the user-written code may be external to the application code (110). For example, the user-written code may be stored in an XML file. The framework may implement inversion of control, such that the overall flow of control of the application code (110) is dictated by the framework rather than by the application code (110). For example, creating and accessing objects may be managed by the framework rather than being managed by the application code (110).

In one or more embodiments, a framework object registration (122A) includes a scope (126). The scope (126) may determine how a framework object request (124A) is processed. In one or more embodiments, a framework object request (124A) is a request for an object managed by the framework. The request may specify an object type. In one or more embodiments, a framework object registered with a singleton scope corresponds to a single object instance. Thus, each framework object request (124A) for the framework object registered with a singleton scope may access the same object instance. Alternatively, a framework object registered with a prototype scope may correspond to multiple object instances, such that a new object instance is created each time a framework object request (124A) for the registered framework object is processed. Still alternatively, a framework object registration (122A) may include other types of scopes (126). For example, a session scope may indicate that access to the framework object is restricted to a single session (e.g., a specific session between a client and a server). Alternatively, a request scope may indicate that access to the framework object is restricted to a single request (e.g., a specific request from a client to a server). In one or more embodiments, a framework object registered with a session scope corresponds to a single object instance. Similarly, a framework object registered with a request scope may correspond to a single object instance.

A framework object request (124A) may be represented declaratively. An example of a declarative framework object request (124A) is the @Autowired annotation that directs the Spring framework to inject an object into a field corresponding to the @Autowired annotation. Alternatively, a framework object request (124A) may be represented procedurally, for example, by calling a method (e.g., the ApplicationContext.getBean method).

In one or more embodiments, the configuration information (112) indicates which components of the application code (110) define (e.g., create) objects that are managed (e.g., registered) by the framework. In other words, the configuration information (112) indicates which components of the application code (110) include framework object registrations (122A, 122N). The components of the application code (110) may be classes, methods, functions, interfaces, packages and/or other units within the application code (110). The configuration information (112) may be annotations included within the application code (110). One example of configuration information (112) is the @Configuration annotation in the Spring framework indicating that a class defines one or more @Bean methods (e.g., framework object registrations (122A, 122N)). Alternatively, the configuration information (112) may be external to the application code (110). For example, the configuration information (112) may be stored in an XML file.

In one or more embodiments, the synthetic code (114) includes code generated (e.g., by the code transformer (104)) from framework object registrations (122A, 122N), framework object requests (124A, 124N), and configuration information (112). The synthetic code (114) may explicitly model the behavior of the framework implicit in framework object registrations (122A, 122N) and framework object requests (124A, 124N). In one or more embodiments, the synthetic code (114) includes global variables (132), synthetic requests (134), and synthetic constructors (136).

In one or more embodiments, global variables (132) are variables that are accessible to any component of the application code (110). The global variables (132) may be stored in one or more components of the application code (110). For example, the global variables (132) may be stored in static fields of classes. For example, a "configurations" class may include static fields corresponding to each component that includes a framework object registration (122A). Continuing this example, the component may be a class annotated with the Spring @Configuration annotation. Still continuing this example, the name of each static field in the configurations class may be the name of a class in the application code (110) that includes a framework object registration (122A).

In one or more embodiments, when a framework object is registered with a singleton scope, then a global variable (132) may correspond to a framework object instance. That is, the synthetic code (114) may assign the value of a global variable (132) to a framework object instance. For example, as described below, the framework object instance may be accessed by all synthetic requests (134) for the framework object. Continuing this example, the synthetic code (114) may include a singleton class that includes global variables (132) corresponding to framework object instances. The synthetic code (114) may also include a session class and a request class to hold global variables corresponding to framework object instances generated from framework objects registered with a session scope and a request scope, respectively.

Each class that includes a framework object registration (122A) may be referred to as the "registering class" for the framework object registration (122A). Each registering class may have an associated constructor that creates instances of the registering class. For example, in Java, the default constructor may be the init( ) function. In one or more embodiments, a synthetic constructor (136) is a function that initializes the value of a global variable (132) to a framework object instance (e.g., an instance of a framework object registered with a singleton scope). In one or more embodiments, the synthetic constructor (136) may be added (e.g., by the code transformer (104)) to the constructor for the registering class.

In one or more embodiments, a synthetic request (134) is a statement that accesses an object instance generated from a framework object. The object instance may be accessed via a global variable (132). For example, the synthetic request (134) may be a statement that loads the object instance from a global variable (132) when the framework object corresponding to the object instance is registered with a singleton, session, or request scope. Alternatively, when the framework object is registered with a prototype scope, the synthetic request (134) may be a statement that invokes a constructor that returns a new instance of the framework object.

In one or more embodiments, the static analysis (118) is a method of analyzing the application code (110) without executing the application code (110). For example, the goal of the static analysis (118) may be to identify potential defects or security flaws (e.g., taint flows) in the application code (110).

In one or more embodiments, the code transformer (104) may be implemented in hardware (e.g., circuitry), software, firmware, and/or any combination thereof. The code transformer (104) may be implemented as part of a compiler. In one or more embodiments, the code transformer (104) includes functionality to extract framework object registrations (122A, 122N) and framework object requests (124A, 124N) from the application code (110). The code transformer (104) may include functionality to derive synthetic code (114) from the extracted framework object registrations (122A, 122N), framework object requests (124A, 124N), and/or configuration information (112). The code transformer (104) may include functionality to transform the application code (110) using the synthetic code (114). In one or more embodiments, the code transformer (104) includes functionality to detect defects in the application code (110) by executing a static analysis (116).

In one or more embodiments, the computer processor (106) includes functionality to execute the application code (110). In one or more embodiments, the computer processor (106) includes functionality to execute the code transformer (104).

While FIG. 1 shows a configuration of components, other configurations may be used without departing from the scope of the invention. For example, various components may be combined to create a single component. As another example, the functionality performed by a single component may be performed by two or more components.

Figure 2A:
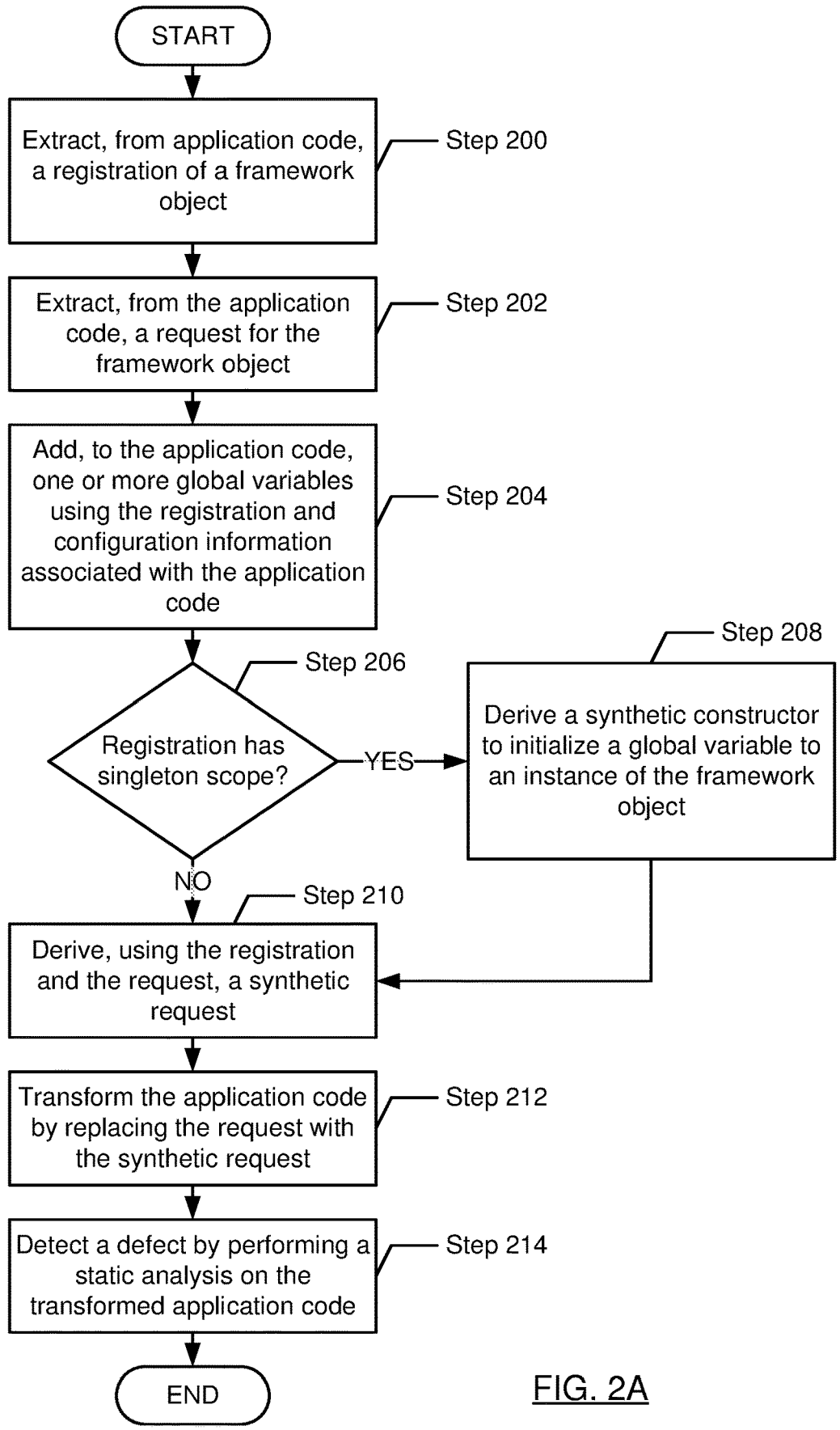
FIG. 2A and FIG. 2B show flowcharts in accordance with one or more embodiments of the invention.

FIG. 2A shows a flowchart in accordance with one or more embodiments of the invention. The flowchart depicts a process for detecting a defect. One or more of the steps in FIG. 2A may be performed by the components (e.g., the code transformer (104) of the computer system (100)), discussed above in reference to FIG. 1. In one or more embodiments of the invention, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 200, a registration of a framework object is extracted from application code. In one or more embodiments, the code transformer examines the statements of the application code and extracts the registration from an annotation (e.g., the @Bean annotation in the Spring framework) known to correspond to a registration of a framework object. For example, the code transformer may access a list of annotations in one or more frameworks that correspond to the registration of a framework object. In one or more embodiments, the code transformer extracts the registration from configuration information (e.g., configuration information stored in an XML file) known to correspond to a registration of a framework object.

In Step 202, a request for the framework object is extracted from the application code. The request may be represented declaratively. For example, the code transformer may examine the statements of the application code and extract the request from an annotation (e.g., the @Autowired annotation in the Spring framework) known to correspond to a request for a framework object. Alternatively, the request may be represented procedurally. For example, the code transformer may extract the request from procedural code known to correspond to a request for a framework object. For example, the code transformer may access a list of function calls that correspond to a request for a framework object. In one or more embodiments, the code transformer examines extracts the request from configuration information (e.g., configuration information stored in an XML file) known to correspond to a request for a framework object.

In Step 204, one or more global variables are added to the application code using the registration and configuration information associated with the application code. In one or more embodiments, the code transformer creates a global variable by adding, to a configurations class, a static field corresponding to the registering class in the application code that includes the registration extracted in Step 200 above. The code transformer may examine the configuration information to identify the registering class. The code transformer may assign the value of the global variable to an instance of the registering class. In one or more embodiments, the code transformer creates a global variable corresponding to each registering class in the application code that registers a framework object.

If, in Step 206, a determination is made that the registration specifies a singleton scope, session scope, or a request scope, then Step 208 below is executed. Otherwise, if in Step 206 a determination is made that the registration does not specify a singleton scope, session scope, or a request scope, then Step 210 below is executed.

In Step 208, a synthetic constructor that initializes a global variable to an instance of the framework object is derived, using the registration and the configuration information. In one or more embodiments, the code transformer adds, to a singleton class, a static field corresponding to the framework object, when the framework object is registered with a singleton scope. Alternatively, the code transformer may add, to a session class, a static field corresponding to the framework object, when the framework object is registered with a session scope. Still alternatively, the code transformer may add, to a request class, a static field corresponding to the framework object, when the framework object is registered with a request scope.

The code transformer may modify a constructor for the registering class to create an instance of the framework object, and assign the instance to the global variable. For example, the code transformer may add, to the constructor for the registering class, a synthetic constructor that initializes the value of the global variable to the result of invoking a constructor that returns a new instance of the framework object. For example, as described below in Step 210, when the registration specifies a singleton scope, each synthetic request for the framework object may access the same instance of the framework object via the global variable.

In Step 210, a synthetic request is derived using the registration and the request. The code transformer may derive the synthetic request by creating a statement that accesses an instance of the framework object specified in the request, according to a scope specified in the registration. In one or more embodiments, the code transformer identifies the framework object based on verifying that the object type of the framework object matches the object type specified in the request. When the registration specifies a singleton scope, the statement may access the instance of the framework object by loading the value of a global variable that is accessible to all requests for the framework object (see description of Step 208 above). When the registration specifies a prototype scope, the statement may access the instance of the framework object by invoking a constructor for the framework object. For example, when the registration specifies a prototype scope, the constructor may create a new instance of the framework object corresponding to each request for the framework object.

In one or more embodiments, the framework object instance is created using another framework object instance. For example, a second framework object instance may be an argument to the constructor for the framework object, where the second framework object instance is the result of processing a request for a second framework object.

In Step 212, the application code is transformed by replacing the request with the synthetic request. In one or more embodiments, the code transformer replaces the request with the statement derived in Step 210 above.

In Step 214, the defect is detected by performing a static analysis on the transformed application code. In one or more embodiments, the static analysis detects the defect based on a flow from a framework object instance to a synthetic request. That is, implicit flows from framework object instances to framework object requests may be exposed by deriving synthetic requests and explicit creation of framework object instances. The flow may include a series of statements in the application code. For example, the static analysis may detect the defect by tracing a series of statements that include the creation of an instance of the framework object (e.g., by a synthetic constructor described in Step 208 above) and one or more synthetic requests that access the same framework object instance. As another example, the static analysis may detect the defect by determining that one synthetic request writes a tainted value to the framework object instance and another synthetic request in a security-sensitive operation accesses the framework object instance.

The code transformer may generate a report that includes each defect detected. The report may indicate the framework object registration and the framework object request corresponding to the defect. For example, the report may indicate the locations (e.g., line numbers), in the application code, of the framework object registration and the framework object request.

In one or more embodiments, the process described in FIG. 2A is performed for each framework object registration and each framework object request in the application code.

Figure 2B:
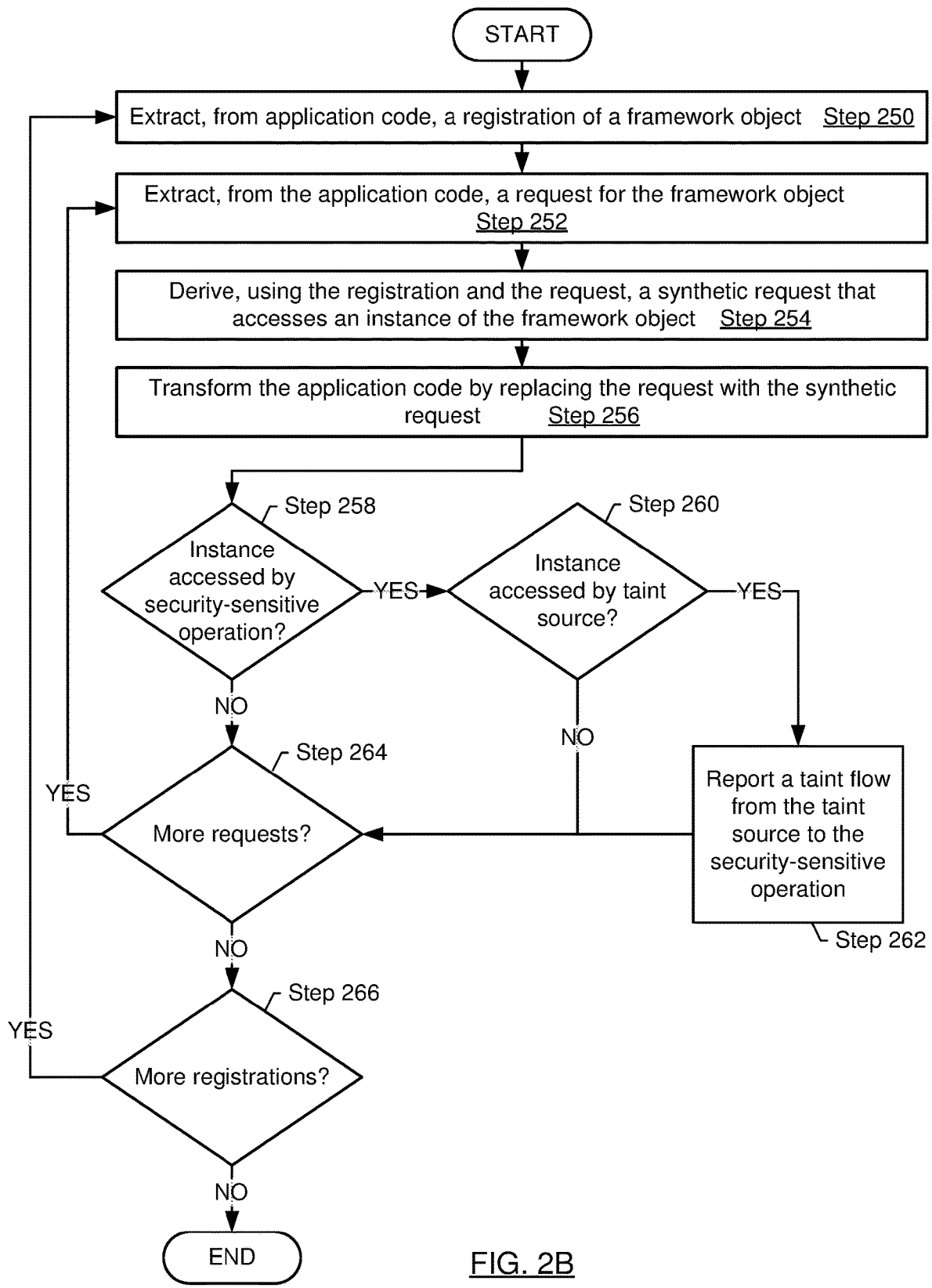

FIG. 2B shows a flowchart in accordance with one or more embodiments of the invention. The flowchart depicts a process for detecting a taint flow. One or more of the steps in FIG. 2B may be performed by the components (e.g., the code transformer (104) of the computer system (100)), discussed above in reference to FIG. 1. In one or more embodiments of the invention, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 250, a registration of a framework object is extracted from application code (see description of Step 200 above).

In Step 252, a request for the framework object is extracted from the application code (see description of Step 202 above).

In Step 254, a synthetic request that accesses an instance of the framework object specified in the request is derived using the registration and the request (see description of Step 210 above).

In Step 256, the application code is transformed by replacing the request with the synthetic request (see description of Step 212 above).

If, in Step 258, a determination is made, by performing a static analysis on the transformed application code (see description of Step 214 above), that the instance of the framework object is accessed by a security-sensitive operation, then Step 260 below is executed. In one or more embodiments, the security-sensitive operation accesses a security-sensitive resource of the computer system. The code transformer may determine that an operation is a security-sensitive operation by consulting a list of known security-sensitive operations. In one or more embodiments, the security-sensitive operation includes the synthetic request. For example, as described in Step 210 above, the synthetic request may access the instance of the framework object via a global variable when the registration specifies a singleton scope. In one or more embodiments, in order to enable subsequent iterations of Step 258 to quickly determine that the instance of the framework object is accessed by a security-sensitive operation, the code transformer logs the security-sensitive operation in a list of security-sensitive operations that access the instance.

Otherwise, if in Step 258 a determination is made that the instance of the framework object is not accessed by a security-sensitive operation, then Step 264 below is executed.

If, in Step 260, a determination is made, by performing a static analysis on the transformed application code, that the instance of the framework object is accessed by a taint source, then Step 262 below is executed. In one or more embodiments, the taint source is a component of the application code that receives potentially tainted data. For example, the taint source may be a function that receives a tainted value from a user or external source. The code transformer may determine that a function is a taint source by consulting a list of known taint sources. For example, the constructor for the registering class may be the taint source (e.g., if the constructor accepts input from the user or an external source). In one or more embodiments, the taint source includes the synthetic request. Otherwise, if in Step 260 a determination is made that the instance of the framework object is not accessed by a taint source, then Step 264 below is executed.

In Step 262, the taint flow from the taint source to the security-sensitive operation is reported. The code transformer may report a taint flow corresponding to each combination of a taint source and a security-sensitive operation that both access the instance of the framework object. For example, the code transformer may report each taint flow while processing different requests for the framework object on different iterations of Step 262.

If, in Step 264, it is determined that there are additional requests for the framework object, then Step 252 above is again executed to process the next request. Otherwise, if in Step 264 a determination is made that there are no additional requests for the framework object, then Step 266 below is executed.

If, in Step 266, it is determined that there are additional registrations of a framework object, then Step 250 above is again executed to process the next registration.

Figure 3A:
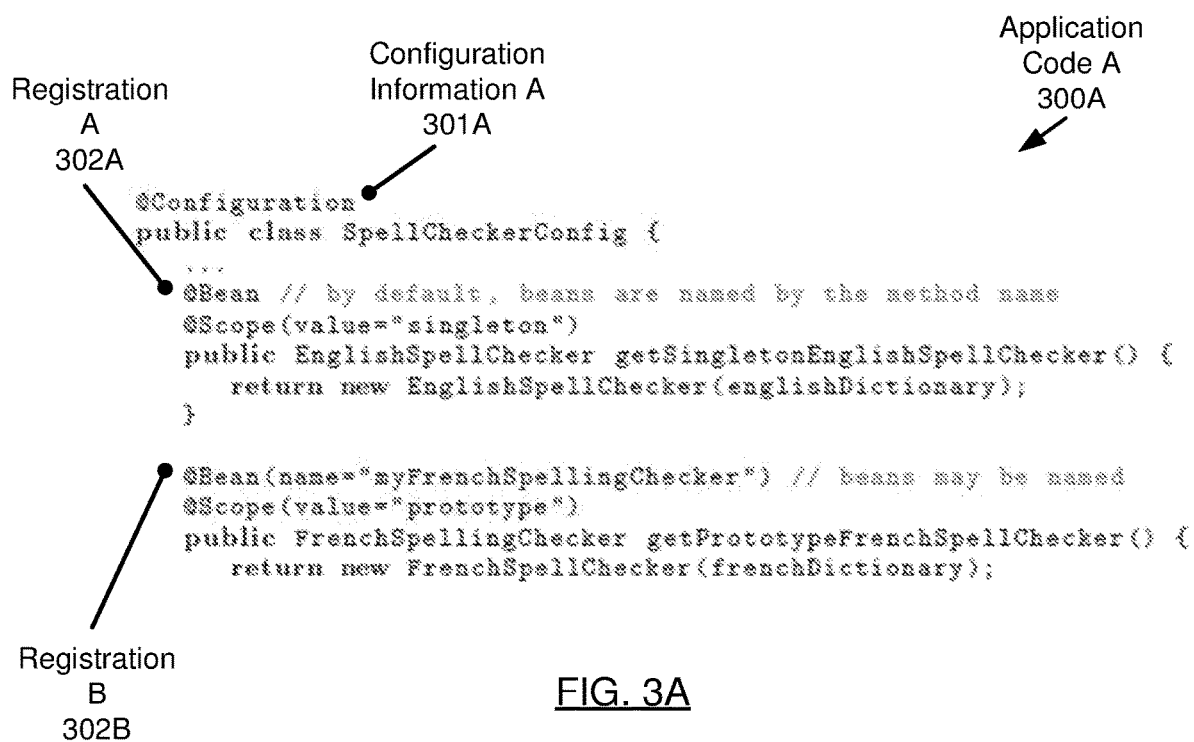
Figure 3B:
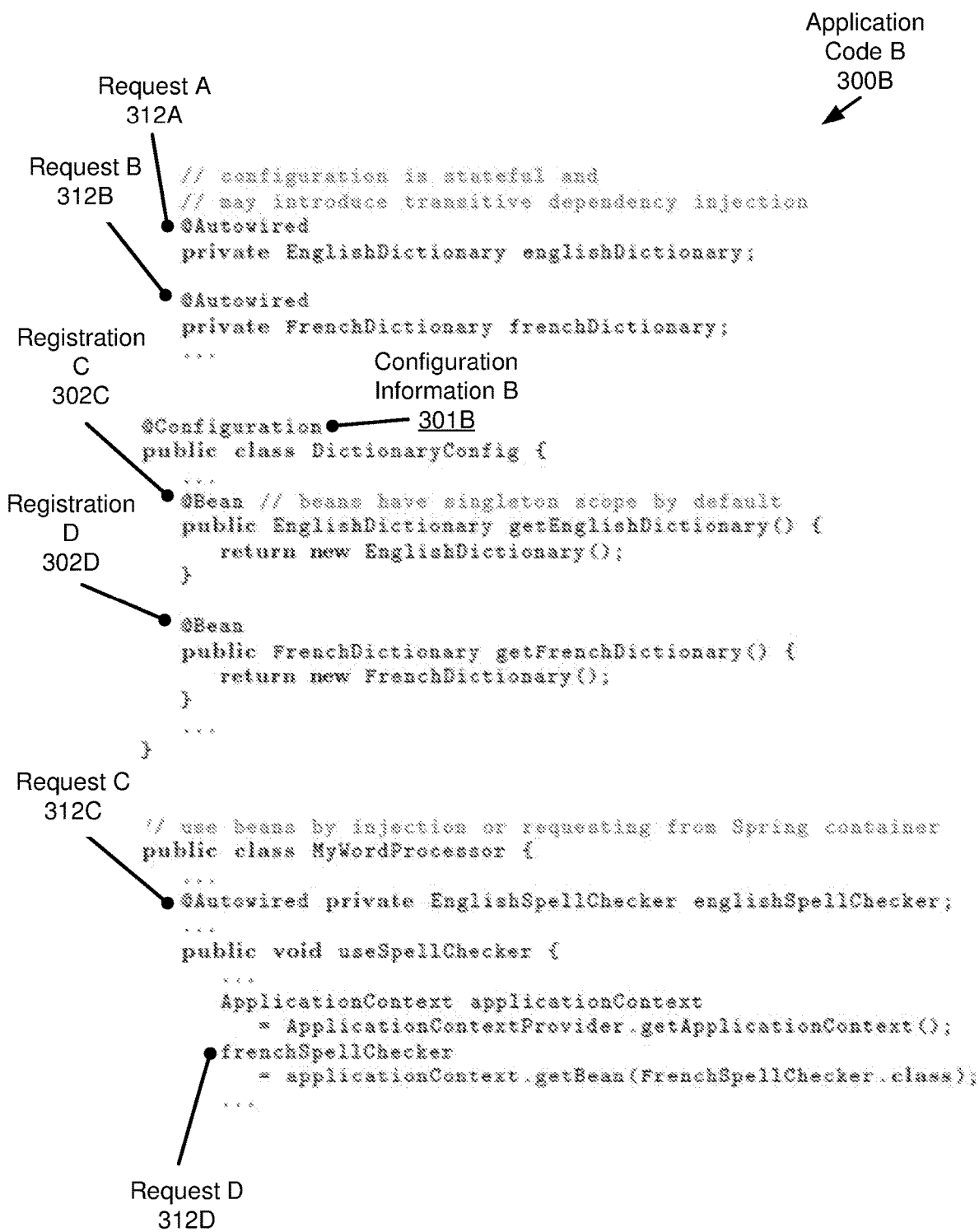

The following examples are for explanatory purposes only and not intended to limit the scope of the invention. FIG. 3A, FIG. 3B, FIG. 3C, and FIG. 3D show an implementation example in accordance with one or more embodiments of the invention. FIG. 3A and FIG. 3B show application code (300A, 300B) ((110) in FIG. 1) which includes configuration information (301A, 301B) ((112) in FIG. 1), registrations (302A, 302B, 302C, 302D) ((122A, 122N) in FIG. 1), and requests (312A, 312B, 312C, 312D) ((124A, 124N) in FIG. 1). Configuration information A (301A) in FIG. 3A is a Spring annotation @Configuration indicating that the class SpellCheckerConfig includes one or more framework object (e.g., bean) registrations, in this case registration A (302A) and registration B (302B). Configuration information B (301B) in FIG. 3B indicates that the class DictionaryConfig includes one or more framework object (e.g., bean) registrations, in this case registration C (302C) and registration D (302D).

Registration A (302A) in FIG. 3A is a Spring annotation @Bean that registers the framework object EnglishSpellChecker with a singleton scope, as indicated by the Spring annotation @Scope. Thus, all requests for the framework object EnglishSpellChecker will access the same instance of EnglishSpellChecker. Registration B (302B) registers the framework object FrenchSpellingChecker with a prototype scope. Thus, all requests for the framework object FrenchSpellingChecker will access different instances of FrenchSpellingChecker. Registration C (302C) and registration D (302D) in FIG. 3B register the framework objects EnglishDictionary and FrenchDictionary with a singleton scope.

Request A (312A) is a Spring annotation @Autowired that injects the singleton instance of the framework object EnglishDictionary into the local variable englishDictionary. Similarly, request B (312B) is a Spring annotation @Autowired that injects the singleton instance of the framework object FrenchDictionary into the local variable frenchDictionary. And request C (312C) is a Spring annotation @Autowired that injects the singleton instance of the framework object EnglishSpellChecker into the local variable englishSpellChecker. In contrast to the other declarative, annotation-based requests (312A, 312B, 312C), request D (312D) is a procedural request that calls a constructor that creates a new instance of the framework object FrenchSpellChecker.

The code transformer ((104) in FIG. 1) transforms the application code (300A, 300B) shown in FIG. 3A and FIG. 3B into the transformed code (350A, 350B) shown in FIG. 3C and FIG. 3D. Initially, the code transformer extracts the registrations (302A, 302B, 302C, 302D) and the requests (312A, 312B, 312C, 312D) from the application code (300A, 300B). The code transformer then adds global variables (352) ((132) in FIG. 1) using the registrations (302A, 302B, 302C, 302D) and configuration information (301A, 301B). The transformed code (350A) in FIG. 3C includes a configurations class that includes global variables (i.e., static fields) corresponding to new instances of the "registering" classes that include framework object registrations. In this case, the registering classes are SpellCheckerConfig and DictionaryConfig. The transformed code (350A) also includes a SingletonBeans class that includes global variables getSingletonEnglishSpellChecker, getEnglishDictionary, and getFrenchDictionary (i.e., static fields) corresponding to instances of the framework objects registered with a singleton scope, in this case framework objects EnglishSpellChecker, EnglishDictionary, and FrenchDictionary.

As shown in FIG. 3C, the code transformer adds synthetic constructor A (354A) ((136) in FIG. 1) to the SpellCheckerConfig class, the registering class that includes registration A (302A) of FIG. 3A. Since registration A (302A) registers the framework object EnglishSpellChecker with a singleton scope, synthetic constructor A (354A) initializes the global variable corresponding to EnglishSpellChecker to the result of invoking a constructor that returns a new instance of the framework object EnglishSpellChecker. Similarly, as shown in FIG. 3D, the code transformer adds synthetic constructor B (354B) and synthetic constructor C (354C) to the DictionaryConfig class, the registering class that includes registration C (302C) and registration D (302D) of FIG. 3B. Since registration C (302C) and registration D (302D) register the framework objects EnglishDictionary and FrenchDictionary with a singleton scope, synthetic constructor B (354B) initializes the global variables corresponding to the framework objects EnglishDictionary and FrenchDictionary to the results of invoking constructors that returns new instances of EnglishDictionary and FrenchDictionary, respectively.

The code transformer then replaces request A (312A) of FIG. 3B with synthetic request A (362A) of FIG. 3C ((134) in FIG. 1). Synthetic request A (362A) loads, into the local variable englishDictionary, the value of the global variable getEnglishDictionary in the SingletonBeans class. As described above, the global variable getEnglishDictionary was initialized to an instance of the framework object EnglishDictionary by synthetic constructor B (354B) of FIG. 3D.

Next, the code transformer replaces request B (312B) of FIG. 3B with synthetic request B (362B) of FIG. 3D. Synthetic request B (362B) loads, into the local variable frenchDictionary, the value of the global variable getFrenchDictionary in the SingletonBeans class. As described above, the global variable getFrenchDictionary was initialized to an instance of the framework object FrenchDictionary by synthetic constructor C (354C) of FIG. 3D.

Then, the code transformer replaces request C (312C) of FIG. 3B with synthetic request C (362C) of FIG. 3D. Synthetic request C (362C) loads, into the local variable englishSpellChecker, the value of the global variable getSingletonEnglishSpellChecker in the SingletonBeans class. As described above, the global variable getSingletonEnglishSpellChecker was initialized to an instance of the framework object EnglishSpellChecker by synthetic constructor A (354A) of FIG. 3C.

The code transformer then replaces request D (312D) of FIG. 3B with synthetic request D (362D) of FIG. 3D. Synthetic request D (362D) assigns, to the local variable frenchSpellChecker, a new instance of the framework object FrenchSpellChecker. The new instance of FrenchSpellChecker is returned by a call to the constructor getPrototypeFrenchSpellChecker of the registering class SpellCheckerConfig, the class that includes registration B (302B) of the framework object FrenchSpellChecker. The global variable spellCheckerConfig, an instance of the registering class SpellCheckerConfig, is used as the receiver for the constructor getPrototypeFrenchSpellChecker. The global variable spellCheckerConfig is one of the global variables (352) in the Configurations class, as shown in FIG. 3C.

Finally, the code transformer detects the defect by performing a static analysis on the transformed code (350A, 350B). The static analysis detects the defect based on the flows from explicitly created framework object instances to synthetic requests that access the framework object instances. In this case, the framework object instance englishDictionary is a tainted value that flows to synthetic request A (362A).

Figure 4C:
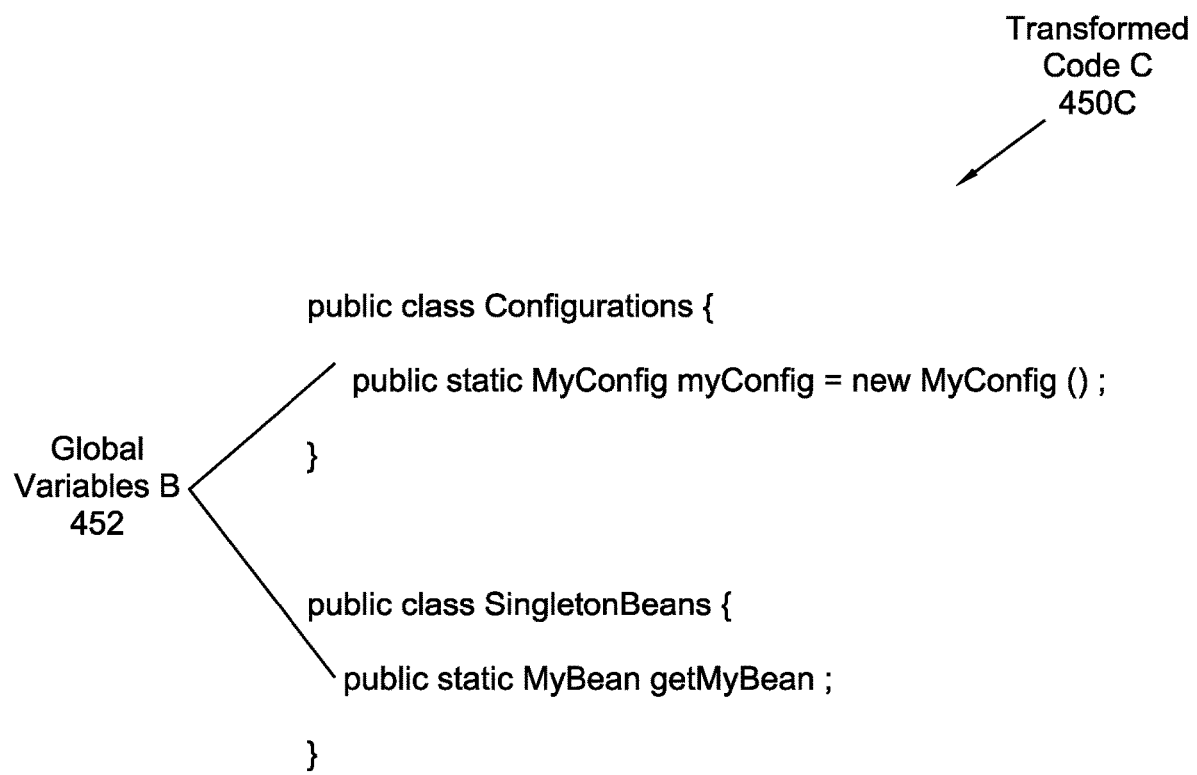

FIG. 4A, FIG. 4B, FIG. 4C, FIG. 4D, and FIG. 4E show an implementation example in accordance with one or more embodiments of the invention. FIG. 4A and FIG. 4B show application code (400C, 400D) which includes configuration information (401), a registration (402), requests (412E, 412F), a taint source (414), and a security-sensitive operation (416). Configuration information C (401) is a Spring annotation @Configuration indicating that the class MyConfig includes one or more framework object (e.g., bean) registrations, in this case registration E (402). Registration E (402) is a Spring annotation @Bean that registers the framework object MyBean with a singleton scope (the default scope in the Spring framework). Thus, all requests for the framework object MyBean will access the same instance of MyBean. Request E (412E) assigns the singleton instance of the framework object MyBean to the local variable myBean by calling a constructor for the framework object MyBean. Request E (412E) is included in the taint source (414). The taint source (414) is a function that receives a tainted value as an argument (e.g., because the argument is obtained from a user or external source). Request F (412F) is a Spring annotation @Autowired that injects the singleton instance of the framework object MyBean into the local variable bean. The security-sensitive operation (416) accesses the operating system kernel, a security-sensitive resource of the computer system ((100) in FIG. 1).

The code transformer transforms the application code (400C, 400D) shown in FIG. 4A and FIG. 4B into the transformed code (450C, 450D, 450E) shown in FIG. 4C, FIG. 4D, and FIG. 4E. Initially, the code transformer extracts registration E (402), request E (412E), and request F (412F) from the application code (400C, 400D). The code transformer then adds global variables (452) using registration E (402) and configuration information C (401). Transformed code C (450C) in FIG. 4C includes a configurations class that includes a global variable (i.e., static field) corresponding to a new instance of the registering class MyConfig that includes registration E (402). Transformed code C (450C) also includes a SingletonBeans class that includes a global variable getMyBean (i.e., static field) corresponding to an instance of the MyBean framework object, which is registered with a singleton scope.

As shown in FIG. 4D, the code transformer adds synthetic constructor D (454) to the MyConfig class, the registering class that includes registration E (402) of FIG. 4A. Since registration E (402) registers the framework object MyBean with a singleton scope, synthetic constructor D (454) initializes the global variable corresponding to MyBean to the result of invoking a constructor that returns a new instance of the framework object MyBean.

The code transformer then replaces, within the taint source (414), request E (412E) of FIG. 4B with synthetic request E (462E) of FIG. 4D. Synthetic request E (462E) loads, into the local variable myBean, the value of the global variable getMyBean in the SingletonBeans class. As described above, the global variable getMyBean was initialized to an instance of the framework object MyBean by synthetic constructor D (454).

Next, as shown in FIG. 4E, the code transformer replaces request F (412F) of FIG. 4B with synthetic request F (462F) of FIG. 4D. Synthetic request F (462F) loads, into the local variable bean, the value of the global variable getMyBean in the SingletonBeans class.

Finally, the code transformer detects the taint flow from the taint source (414) to the security-sensitive operation (416) by performing a static analysis on the transformed code (450C, 450D, 450E). The static analysis detects the taint flow based on the flows from the explicitly created framework object instance by a constructor (e.g., synthetic constructor D (454)) to the synthetic requests that access the framework object instance. In this case, the global variable getMyBean is assigned a tainted value that is aliased by both the local variable myBean of synthetic request E (462E) written by the taint source (414), as well as the local variable bean of synthetic request F (462F) accessed by the security-sensitive operation (416). In contrast, the static analysis would not detect the taint flow when analyzing the untransformed application code (400C, 400D), since the creation of framework object instances and the access of framework object instances via requests for framework objects remain hidden within the implementation of the framework.

Figure 5A:
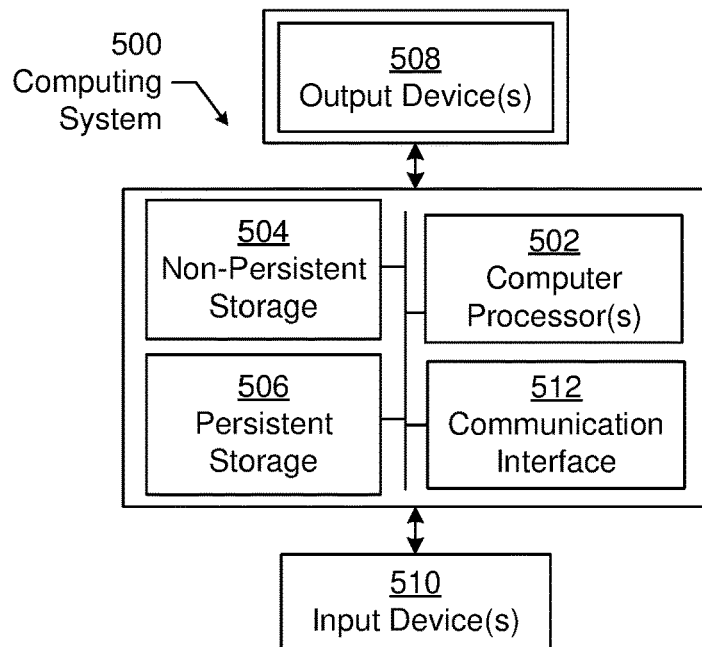
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
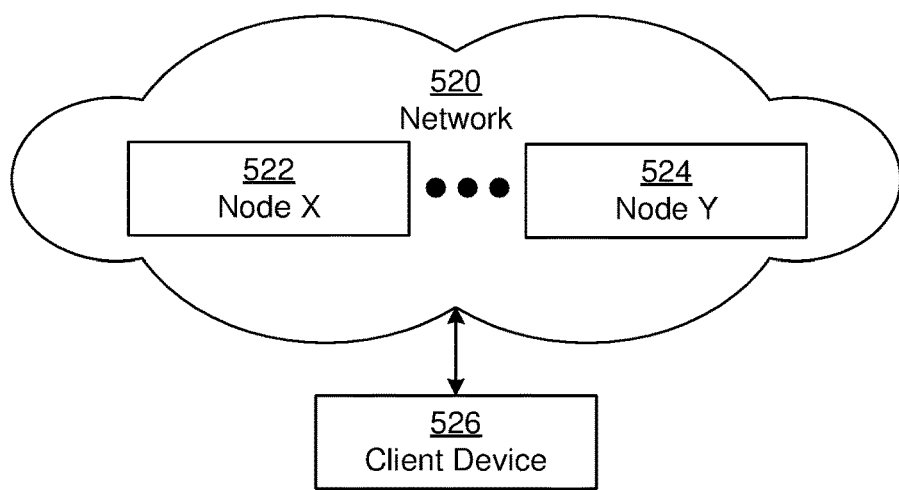

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for enabling the detection of defects during static analysis of framework objects, comprising:
    extracting, from application code, a first registration that specifies a singleton scope of a first framework object and a first plurality of requests for the first framework object, wherein the singleton scope determines that a single instance of the first framework object is created in response to the first plurality of requests, and wherein the first plurality of requests access the single instance of the first framework object;
    extracting, from the application code, a second registration that specifies a prototype scope of a second framework object and a second plurality of requests for the second framework object, wherein the prototype scope determines that multiple instances of the second framework object are created in response to the second plurality of requests, and wherein the second plurality of requests access the multiple instances of the second framework object;
    deriving a first synthetic request based on the singleton scope specified by the first registration and a first request of the first plurality of requests;
    deriving a second synthetic request based on the prototype scope specified by the second registration and a second request of the second plurality of requests;
    deriving, using the first registration and configuration information associated with the application code, a first synthetic constructor that initializes a first global variable to the instance of the first framework object wherein the first synthetic request accesses the instance of the first framework object via the global variable;
    deriving, using the second registration and the configuration information associated with the application code, a second synthetic constructor that initializes a new instance of the second framework object, wherein the second synthetic request accesses the new instance of the second framework object;
    transforming the application code by replacing, by a computer processor, the first request with the first synthetic request and the second request with the second synthetic request;
    adding, by the computer processor, the first synthetic constructor and the second synthetic constructor to the application code; and
    detecting the defect by performing a static analysis on the transformed application code.

2. The method of claim 1, further comprising:
    deriving, using the first registration and a third request of the first plurality of requests, a third synthetic request, wherein the third synthetic request accesses the instance of the first framework object; and
    replacing, in the application code, the third request with the third synthetic request.

3. The method of claim 2, further comprising:
    generating a report comprising the defect, wherein the defect comprises a flow comprising the first synthetic request and the third synthetic request.

4. The method of claim 1, wherein the second synthetic request comprises a first call to a constructor for the second framework object, the method further comprising:
    deriving, using the second registration and a third request of the second plurality of requests, a third synthetic request, wherein the third synthetic request comprises a second call to the constructor; and
    replacing, in the application code, the third request with the third synthetic request.

5. The method of claim 1, wherein the first synthetic request accesses an instance of the first framework object, the method further comprising:
    extracting, from the application code, a third registration of a third framework object and a third plurality of requests for the third framework object;
    deriving, using the third registration and a third request of the third plurality of requests, a third synthetic request that accesses an instance of the third framework object, wherein the instance of the first framework object is created using the instance of the third framework object; and
    replacing, in the application code, the third request with the third synthetic request.

6. The method of claim 1, wherein the first request specifies an object type, and wherein deriving the first synthetic request comprises matching the object type to an object type of the first framework object.

7. A system for enabling the detection of defects during static analysis of framework objects, comprising:
    a memory coupled to a computer processor;
    a repository configured to store application code comprising:
        a first registration that specifies a singleton scope of a first framework object and a first plurality of requests for the first framework object, wherein the singleton scope determines that a single instance of the first framework object is created in response to the first plurality of requests, and wherein the first plurality of requests access the single instance of the first framework object, and
        a second registration that specifies a prototype scope of a second framework object and a second plurality of requests for the second framework object, wherein the prototype scope determines that multiple instances of the second framework object are created in response to the second plurality of requests, and wherein the second plurality of requests access the multiple instances of the second framework object; and a code transformer, executing, on the computer processor and using the memory, configured to:
extract the first registration and the first plurality of requests from the application code,
extract the second registration and the second plurality of requests from the application code,
derive a first synthetic request based on the singleton scope specified by the first registration and a first request of the first plurality of requests,
derive a second synthetic request based on the prototype scope specified by the second registration and a second request of the second plurality of requests,
derive, using the first registration and configuration information associated with the application code, a first synthetic constructor that initializes a first global variable to the instance of the first framework object, wherein the first synthetic request accesses the instance of the first framework object via the global variable;
derive, using the second registration and the configuration information associated with the application code, a second synthetic constructor that initializes a new instance of the second framework object, wherein the second synthetic request accesses the new instance of the second framework object;
transform the application code by replacing the first request with the first synthetic request and the second request with the second synthetic request,
add the first synthetic constructor and the second synthetic constructor to the application code; and
detect the defect by performing a static analysis on the transformed application code.

8. The system of claim 7, wherein the code transformer is further configured to:
derive, using the first registration and a third request of the first plurality of requests, a third synthetic request, wherein the third synthetic request accesses the instance of the first framework object, and
replace, in the application code, the third request with the third synthetic request.

9. The system of claim 8, wherein the code transformer is further configured to generate a report comprising the defect, and wherein the defect comprises a flow comprising the first synthetic request and the third synthetic request.

10. The system of claim 7, wherein the second synthetic request comprises a first call to a constructor for the second framework object, and wherein the code transformer is further configured to:
derive, using the second registration and a third request of the second plurality of requests, a third synthetic request, wherein the third synthetic request comprises a second call to the constructor, and
replace, in the application code, the third request with the third synthetic request.

11. The system of claim 7, wherein the first synthetic request accesses an instance of the first framework object, and wherein the code transformer is further configured to:
extract, from the application code, a third registration of a third framework object and a third plurality of requests for the third framework object,
derive, using the third registration and a third request of the third plurality of requests, a third synthetic request that accesses an instance of the third framework object, wherein the instance of the first framework object is created using the instance of the third framework object, and
replace, in the application code, the third request with the third synthetic request.

12. The system of claim 7, wherein the first request specifies an object type, and wherein deriving the first synthetic request comprises matching the object type to an object type of the first framework object.

13. A method for enabling the detection of a taint flow during static analysis of framework objects, comprising:
extracting, from application code, a first registration that specifies a singleton scope of a first framework object and a first plurality of requests for the first framework object, wherein the singleton scope determines that a single instance of the first framework object is created in response to the first plurality of requests, and wherein the first plurality of requests access the single instance of the first framework object;
extracting, from the application code, a second registration that specifies a prototype scope of a second framework object and a second plurality of requests for the second framework object, wherein the prototype scope determines that multiple instances of the second framework object are created in response to the second plurality of requests, and wherein the second plurality of requests access the multiple instances of the second framework object;
deriving, based on the singleton scope specified by the first registration and a first request of the first plurality of requests, a first synthetic request that accesses the single instance of the first framework object;
deriving, based on the prototype scope specified by the second registration and a second request of the second plurality of requests, a second synthetic request;
deriving, using the first registration and configuration information associated with the application code, a first synthetic constructor that initializes a first global variable to the instance of the first framework object wherein the first synthetic request accesses the instance of the first framework object via the global variable;
deriving, using the second registration and the configuration information associated with the application code, a second synthetic constructor that initializes a new instance of the second framework object, wherein the second synthetic request accesses the new instance of the second framework object;
transforming the application code by replacing, by a computer processor, the first request with the first synthetic request and the second request with the second synthetic request;
adding, by the computer processor, the first synthetic constructor and the second synthetic constructor to the application code; and
detecting, by performing a static analysis on the transformed application code, the taint flow by:
determining that a security-sensitive operation accesses the single instance of the first framework object, and
determining that a taint source accesses the single instance of the first framework object.

14. The method of claim 13, wherein determining that the security-sensitive operation accesses the single instance of the first framework object comprises determining that the security-sensitive operation comprises the first synthetic request.

15. The method of claim 14, further comprising:
deriving, using the first registration and a third request of the first plurality of requests, a third synthetic request that accesses the single instance of the first framework object,
 wherein transforming the application code further comprises replacing the third request with the third synthetic request, and
 wherein determining that the taint source accesses the single instance of the first framework object comprises determining that the taint source comprises the third synthetic request.

16. The method of claim 15,
wherein the third synthetic request accesses the single instance of the first framework object via the global variable.

* * * * *

UNITED STATES PATENT AND TRADEMARK OFFICE
CERTIFICATE OF CORRECTION

PATENT NO. : 11,106,564 B2  
APPLICATION NO. : 16/425707  
DATED : August 31, 2021  
INVENTOR(S) : Lu Page 1 of 1

It is certified that error appears in the above-identified patent and that said Letters Patent is hereby corrected as shown below:

In the Specification

In Column 15, Line 1, delete "re-organization," and insert -- reorganization, --, therefor.

In the Claims

In Column 15, Line 62, in Claim 1, delete "object" and insert -- object, --, therefor.

In Column 17, Line 6, in Claim 7, delete "executing," and insert -- executing --, therefor.

In Column 18, Line 41, in Claim 13, delete "object" and insert -- object, --, therefor.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*